United States Patent [19]
Smith

[11] Patent Number: 6,049,865
[45] Date of Patent: Apr. 11, 2000

[54] METHOD AND APPARATUS FOR IMPLEMENTING FLOATING POINT PROJECTION INSTRUCTIONS

[75] Inventor: Roger Alan Smith, Austin, Tex.

[73] Assignee: Motorola, Inc., Schaumburg, Pa.

[21] Appl. No.: 08/993,514

[22] Filed: Dec. 18, 1997

[51] Int. Cl.[7] .................................................. G06F 9/302
[52] U.S. Cl. ........................ 712/222; 708/496; 708/513
[58] Field of Search ................................. 708/493, 495, 708/496, 501, 507, 513; 712/221, 222

[56] References Cited

U.S. PATENT DOCUMENTS

| | | | |
|---|---|---|---|
| 5,463,574 | 10/1995 | Desrosiers et al. | 708/495 |
| 5,732,005 | 3/1998 | Kahle et al. | 709/495 |
| 5,822,619 | 10/1998 | Sidwell | 712/221 |
| 5,862,067 | 1/1999 | Mennemeier et al. | 712/221 |
| 5,884,070 | 3/1999 | Panwar | 721/222 |
| 5,886,915 | 3/1999 | Sharangpani et al. | 708/495 |

*Primary Examiner*—Richard L. Ellis
*Attorney, Agent, or Firm*—Paul J. Polansky

[57] ABSTRACT

A floating point unit (60) capable of executing projection instructions provides performance improvement in multiple precision floating point arithmetic. The projection instructions provide for obtaining partial sequences of numbers, products, and sums which have definite alignments and widths which a programmer can set. This allows very fast computation of both individual intermediate computations and final results. A range projection instruction (210, 410) builds a mask with an exponent from one source (230, 430) and a mantissa from another (240, 440). A project instruction (610) builds a result by masking (660) mantissa bits in a source operand after alignment (630) with a mask. Projection multiply (810), add (1000), and subtract instructions build results by masking (850, 1070) mantissa bits of unrounded partial results after alignment (830, 1020, 1040) with a mask.

21 Claims, 10 Drawing Sheets

METHOD AND APPARATUS FOR IMPLEMENTING FLOATING POINT PROJECTION INSTRUCTIONS

FIELD OF THE INVENTION

The present invention generally relates to data processing floating point units, and more specifically to data processing floating point instructions for projecting portions of floating point numbers for use with multiple precision floating point arithmetic, interval arithmetic, and other applications.

BACKGROUND OF THE INVENTION

In writing procedures to compute accurate floating-point function values, in particular correctly-rounded function values, it is desirable to carry out calculations in such a way that intermediate results are represented by more than one floating point value.

Figure 1:
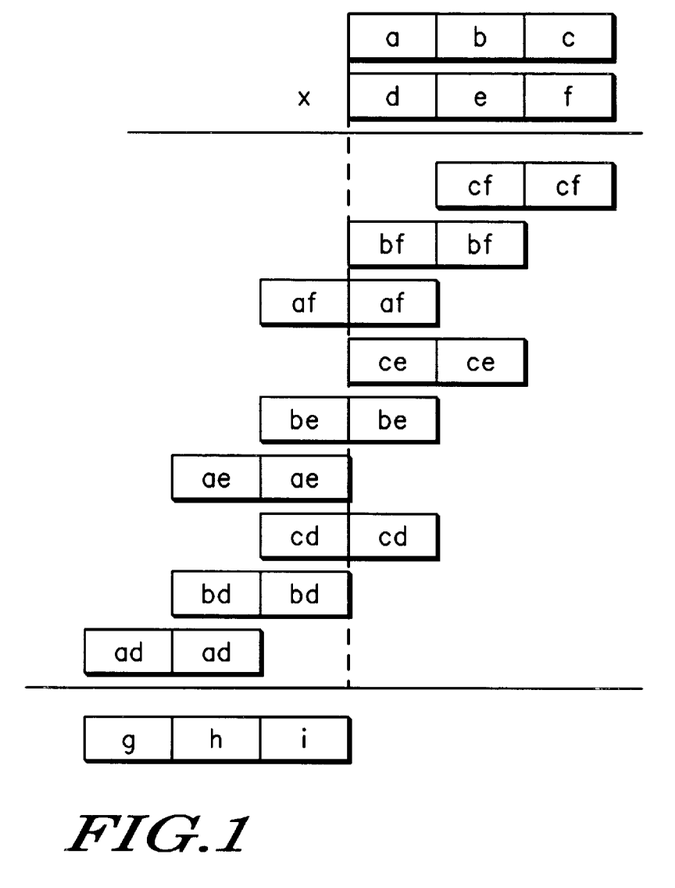
FIG. 1 illustrates multiplication of two multiple-precision numbers.

For example, in computing a value of a function by polynomial methods in which intermediate accuracy of about 150 bits is necessary, it is possible to represent a quantity with 150 bits of accuracy by three double precision values, each containing a 50-bit sequence. The value of the quantity is represented implicitly as a sum of the double precision values. The mathematical values of addition and multiplication are used in evaluating polynomials, so it is desirable to have efficient methods of performing these operations on numbers represented on the three double format. In taking the product of two such 3-double format numbers (a, b, c) and (d, e, f) to form a product represented by (g, h, i), FIG. 1 shows the different terms needed. Each 50 bit piece is represented by a box. Each intermediate product requires two boxes. Thus for example, the product of PC and PF is shown in FIG. 1 as two separate adjacent boxes entitle CF. The left hand box contains the more significant portion and the right hand box contains the less significant portion of the intermediate product.

A good approximation to the desired product can be obtained by dropping the low order 150 bits in computing:

i_temp=high50(af)+high50(be)+high50(cd)+low50(ae)+low50(bd)

i=low50(i_temp)

h_temp=high50(ae)+high50(bd)+low50(ad)+high50(i_temp)

h=low50(h_temp)

g=high50(ad+high_50(h_temp))

The operations "high50" and "low50" compute the first 50 bits and the second 50 bits of a product or sum. The reason for choosing sequences of 50 bits in the particular case is that there is one column where 5 numbers are added together. By limiting each of these numbers to a 50-bit range, the sum is exactly representable in the double precision format, without overflow. This is because $2^{53}/2^{50}=2^3=8$ and 8>5.

Multiple precision arithmetic is often used in interval arithmetic in which the value of a quantity is guaranteed to lie in an interval between two different numerical values. A short interval indicates a number whose value is closely bounded, while a large interval indicates a number whose value is not well known. During normal arithmetic operations on numbers represented by intervals, the sizes of the intervals tend to grow, and multiple precision operations are often needed for a final result to have a tight interval.

In other instances, such as function evaluation, it is often desirable to be able to quickly scale the exponent of a number so that it lies within a certain range. For example, in computing the natural logarithm of a number "x", it is often desirable to be able to quickly scale "x" by a power of two so that it lies between the numbers 1 and 2. This can be performed for normalized numbers "x" in IEEE 754-1984 format by modifying the exponent bits without changing the sign or the mantissa.

In prior art, multiple precision arithmetic has been performed using either the normal integer operations of addition, subtraction, multiplication and shifting or using the normal floating-point operations of conversion to single precision format, addition, subtraction, multiplication, and a fused multiply-add instruction in which the result of the operation is obtained, in effect, by rounding the exact result of multiplying two numbers and adding a third.

There are disadvantages to using integer arithmetic. While the alignment of the product or sum of two numbers is predetermined and fixed when using such arithmetic, the number of bits which are produced by either a product or sum is unfortunately also predetermined and fixed. For example, a 32-bit by 32-bit multiply produces a 64-bit result. In one architecture, a single instruction may return a 64-bit result, while in another architecture, one instruction may return the low-order bits and another instruction the high-order bits. If, as in the example described above, it would be more convenient to work with a smaller number of bits, that option is available only with the addition of extra logical operations to shift or mask undesired bits from the product representation. Compounding this difficulty, typical integer units do not pipeline integer multiply instructions, exponents must be represented by bits in other computer words and manipulated separately, and the number of bits in an integer word may be smaller than the number of bits in a floating-point word, thus requiring that more integer words would be needed than floating-point words. Finally, if parts of a result are to be used as floating-point numbers, it is necessary to convert them from fixed-point format to floating-point format.

There are also disadvantages to using the normal floating-point arithmetic operations. The alignment of a floating-point result is data-dependent, since it depends on the value associated with the most-significant bit of the result. The length of a result is not data-dependent, but it cannot be varied by the programmer. Finally, the result which is returned is a rounded result, so that it is not uncommon for a number to be represented implicitly as the sum of two numbers of opposite sign. In spite of this, it is possible to implement multiple-precision arithmetic using these operations. For example, it is possible to take a number "x" which has a magnitude less than $2^{50}$ and compute its integer and fractional parts by the sequence:

temp=x+big integer_part=temp−big fractional_part=x−integer_part

If the rounding mode is round-to-zero, these instructions will do the job if the number big represents three times $2^{51}$ (assuming IEEE 754-1984 arithmetic). However, the second instruction depends on the result of the first, and the third depends on the result of the second. This means that a significant delay will take place in evaluating these terms in systems with pipelined Floating Point Units (FPUs).

Computing the most and least significant parts of a product is much more tedious. The problem is simplified if there is a fused multiply-add instruction. If "x" and "y" are two numbers less than $2^{50}$, the high and low parts may be computed as temp=x * y+really_big high=temp−really_big low=x * y–high Here, really_big represents the number $3 * 2^{101}$. Each instruction still depends on the other two, so all of the latency problems associated with extracting a certain portion of a single number are present. In other instances, use of the fused multiply to separate a product into two parts which add up to the exact result may be less useful, because different terms may have different alignments (exponents) and as a result it is not easy to perform addition in a straightforward fashion on high and low parts coming from different products. One problem is that a programmer has no direct way to control the number of bits or the alignment of bits which are in one part or the other.

Without a fused multiply-add instruction, the standard method for getting parts of a product of numbers "x" and "y" would be to do things like:

x_high=single(x)

y_high=single(x)

x_low=x–x_high y_low=y–y_low xy_high=x_high * y_high xy_low=x_high * y_low+y_high * x_low.

This method uses a conversion to single-precision to reduce the number of significant bits in "x" and "y", and then takes the leading terms obtained by expanding (x_high+x_low) * (y_high+y_low). As seen, it is more complicated, has more instructions which depend on dependent terms, does not allow definite alignment of either the high part or the low part, and extends to higher precision only with more tedious and time-consuming operations.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

FIG. 1 is illustrates a multiprecision multiplication in which the two operands and the result are each represented as a sum of three floating-point numbers. The different partial products which need to be added together to form the final result are illustrated. The present invention describes a set of instructions for obtaining partial sequences of numbers, products, and sums which have definite alignments and widths which the programmer can set. This invention allows a very fast computation of both the individual intermediate computations and the final results. The illustration shows 9 intermediate product terms and multiple sums are required to get the desired result.

The purposes of the instructions are (1) to be able to quickly generate floating-point masks which contain bits with programmer-controlled alignment and widths, and (2) to be able to quickly project out a single number, a product, a sum, or a difference according to a floating-point mask without rounding taking place.

Figure 2:
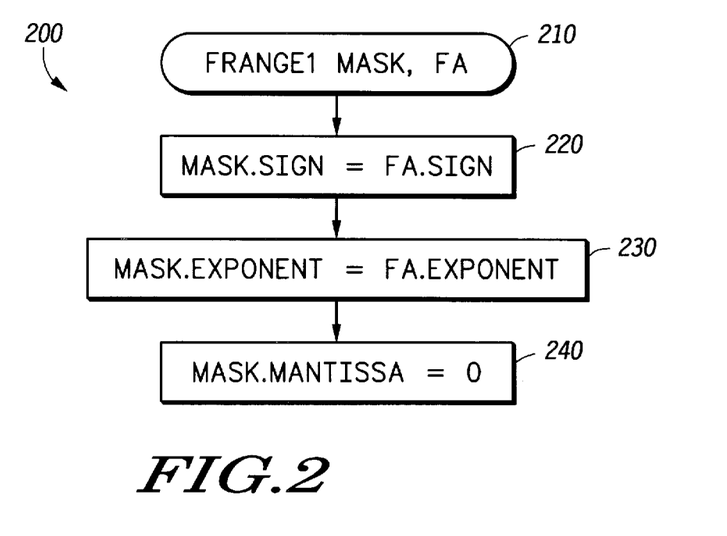
FIG. 2 is a flowchart that illustrates a first method for constructing a floating-point mask which represents a range of bit values.
Figure 3:
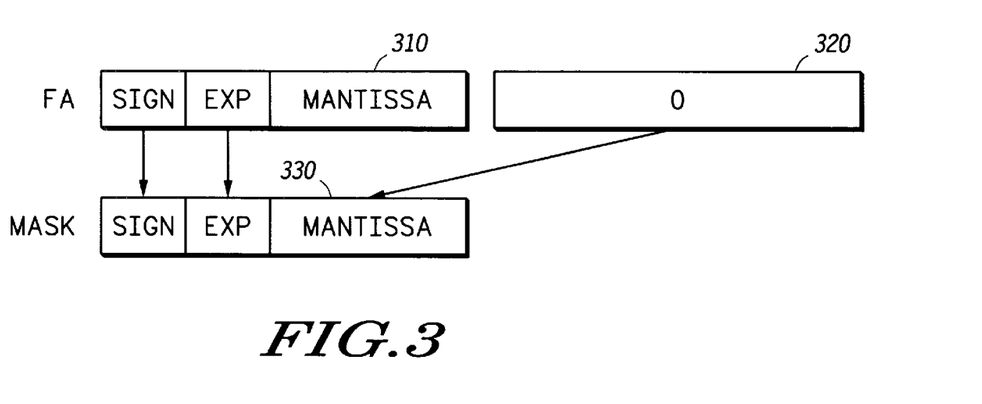
FIG. 3 is a block diagram that illustrates the flow of information in FIG. 2 for a first method for constructing a floating-point mask which represents a range of bit values.

FIG. 2 and FIG. 3 together illustrate a first embodiment of an instruction to generate a floating-point mask. FIG. 2 is a flow chart illustrating operation 200 of an FRANGE1 instruction. FIG. 3 is a block diagram illustrating operation of the FRANGE1 instruction in FIG. 2. The FRANGE1 instruction step 210 has one register result: an output mask 330, and a source register (FA) 310. The mask 330 sign bit is loaded from the FA 310 sign bit, step 220. The mask 330 exponent is loaded from the FA 310 exponent, step 230. Finally, the mask 330 mantissa is set to zero (0) 320, step 240. The FRANGE1 instruction with two register input operands as shown in FIG. 2 can be used to easily and efficiently replace the mantissa portion of an input argument (FA) 310 with zero (0) 320 in a resulting mask register 330. Note that the sign bit and the exponent from the input (FA) 310 register are transferred or gated from the input (FA) 310 register to the output mask 330 register. This variation generates a one-bit mask which could be converted to a width of n bits by multiplying by a constant number 1.1111 . . . 1 containing n bits.

Figure 4:
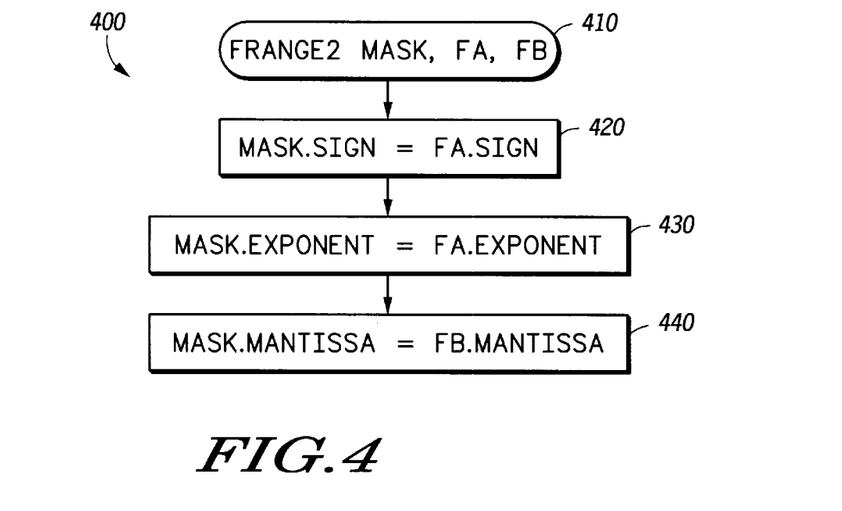
FIG. 4 is a flowchart that illustrates a second method for constructing a floating-point mask which represents a range of bit values.
Figure 5:
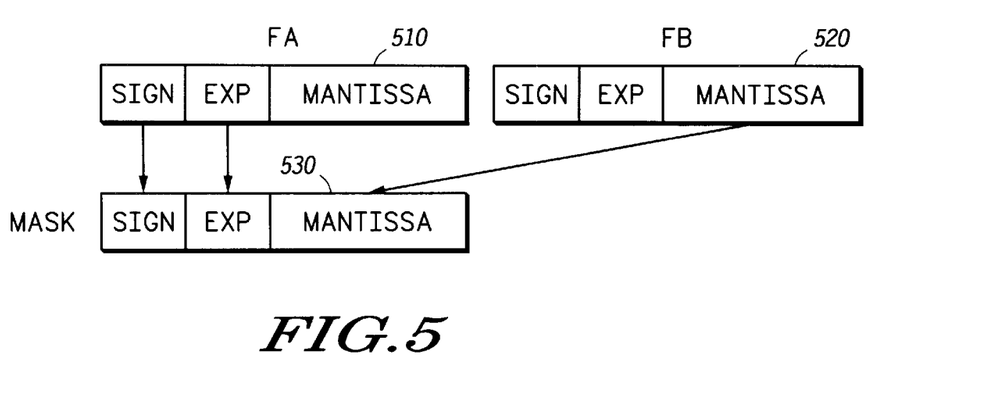
FIG. 5 is a block diagram that illustrates the flow of information in FIG. 4 for a second method for constructing a floating-point mask which represents a range of bit values.

FIGS. 4 and 5 together illustrate a second embodiment of an instruction to generate a floating-point mask. The FRANGE2 instruction. FIG. 4 is a flow chart 400 illustrating a second embodiment. FIG. 5 is a block diagram illustrating the inputs and outputs of the FRANGE2 instruction. This variation of the FRANGE2 instruction has one output result register, an output mask 530, and two input operands FA 510, and FB 520, step 410. The sign bit for the mask 530 register is loaded from sign bit from the FA 510 operand register, step 420. The exponent of the FA 510 register is loaded into the exponent in the resulting mask 530 register, step 430. The mantissa from the FB 520 register is loaded into the mantissa in the output mask 530 register, step 440. The variation in FIGS. 4 and 5 differs from the variation 790 illustrated in FIGS. 2 and 3 in that instead of projecting a constant zero (0) 320 mantissa, the mantissa from the FB 520 input register is used as the mantissa in the output mask register 530. In this use, the mantissa of FB is used to determine the width of the bitfield described by the mask, while the exponent of FA determines the alignment of this bitfield. While the FRANGE2 instruction serves the major purpose of constructing a mask for use with other instructions of this invention to be described below, it also has a useful side purpose of allowing a floating-point number to be scaled so that its exponent is that of another number. For example, in computing the logarithm of a number, it is useful to take a number "x" and produce very quickly a number with the same mantissa but with exponent field 0. This scaled number is required for performing the most time-consuming part of the computation of a logarithm. This side purpose can be achieved with just this one instruction if FA contains the value 1 and FB contains a normalized number "x".

Figure 6:
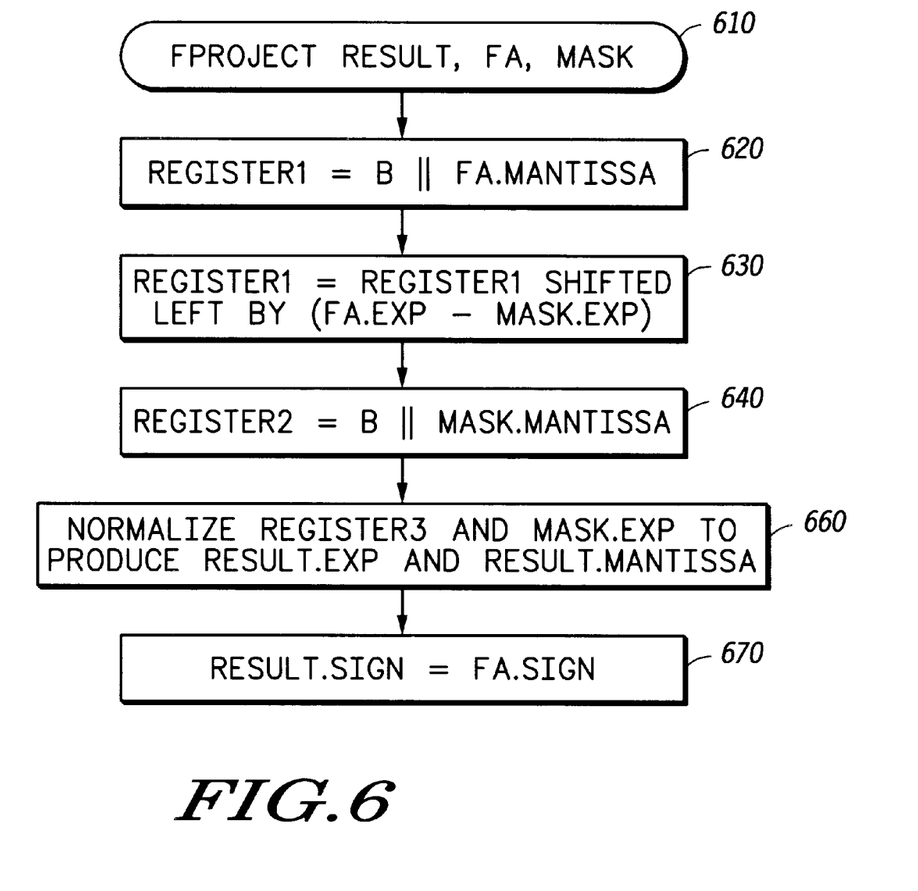
FIG. 6 is a flowchart that illustrates a method for projecting out bits from a first number according to a mask described by a second number.
Figure 7:
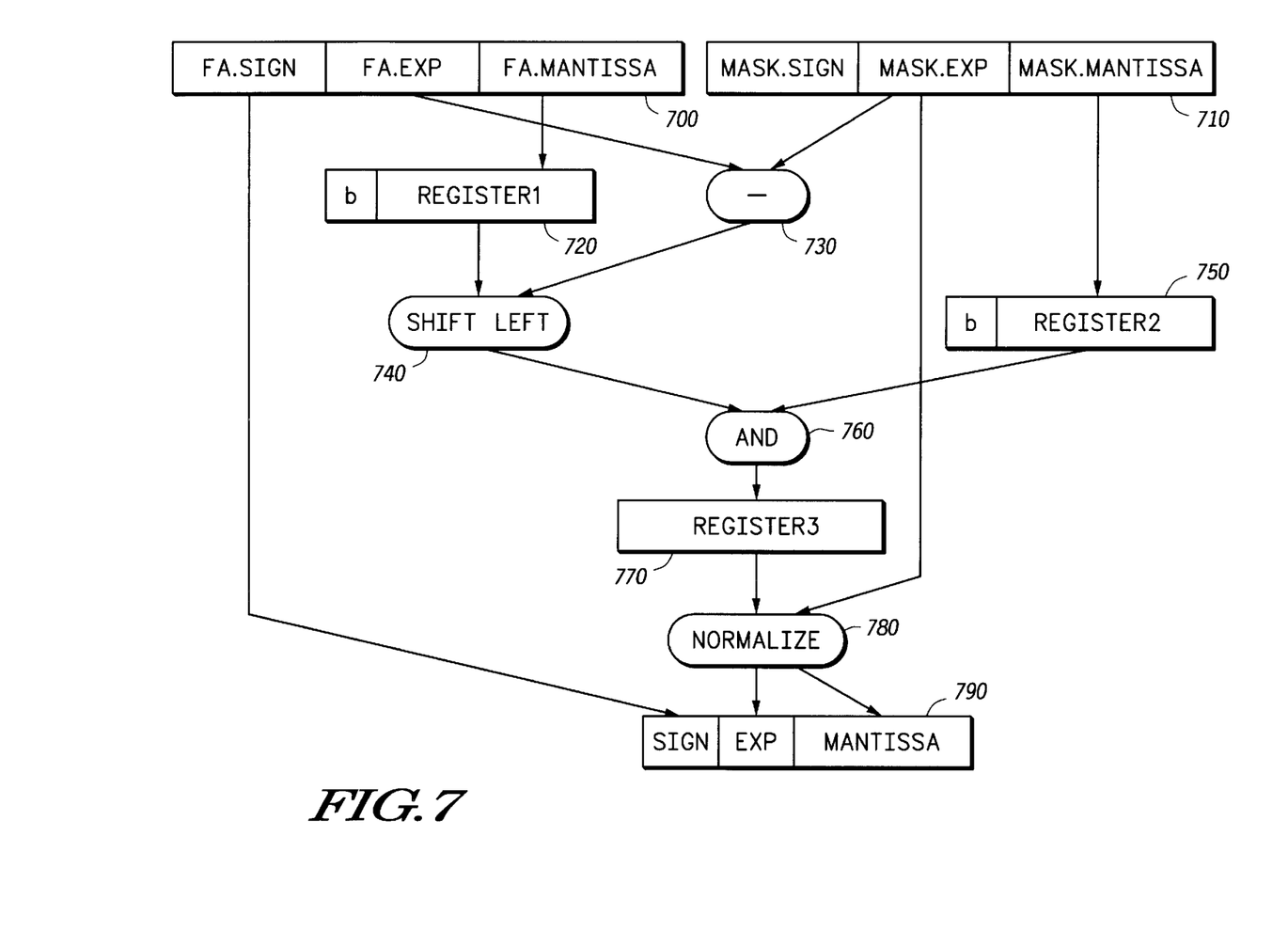
FIG. 7 is a block diagram that illustrates the flow of information in FIG. 6 for projecting out bits from a first number according to a mask described by a second number.

FIGS. 6 and 7 together illustrate an FPROJECT instruction that projects a portion of an input operand (FA) as defined by a mask into a result register. The FPROJECT instruction has one register result 790, and two input operand registers: an input operand (FA) 700 and a mask 710, step 610. A first intermediate register 720 is set to an implicit bit ("b") concatenated to the mantissa in the input operand (FA) 700, step 620. A shift count is determined by subtracting 730 the mask 710 exponent from the FA 700 exponent. This shift count is used to left shift 740 the value in the first intermediate register 720 by the computed shift count value, step 630. If the shift count is negative, the shift is a right shift by the magnitude of the shift count. A second intermediate register 750 is loaded to contain the mask 710 mantissa concatenated with its implicit bit ("b"), step 640. The shifted 740 first intermediate register 720 is ANDed 760 with the second intermediate register 750 to generate a third intermediate register 770, step 650. Note that the shifting has aligned the binary points of the input operand (FA) 700 and the mask 710 based on their respective exponents and that the AND operation then gives exactly the bits in FA 700 which are within the sequence of bits described by the width and alignment of the mask 710. The mask 710 exponent and the masked mantissa in the third intermediate register 770 are normalized 780 to generate the result 790 exponent and mantissa, step 660. The sign of the result 790 is loaded from the sign of the input operand 700. Note that with this one instruction, a sequence of bits of any length up to the bit length of the floating-point word and with arbitrary alignment can be projected from a floating-point number with one instruction.

In the case of an IEEE compliant floating point unit (FPU), the implied bit ("b") has a value of one (1) for normalized numbers and zero (0) for denormalized, unnormalized numbers, and zero. This bit may be made explicit by a CPU during load operations and removed during store operations, so that an implicit bit may have been added before the operands are sent to an FPU. In other floating-point representations, there may be no implicit bit. However, the instructions disclosed herein will also be useful in FPUs supporting floating point formats that do not have implied high order bits or in FPUs in which the implicit bit has already been inserted. In such situations, the implied high order bit ("b") is null.

Figure 8:
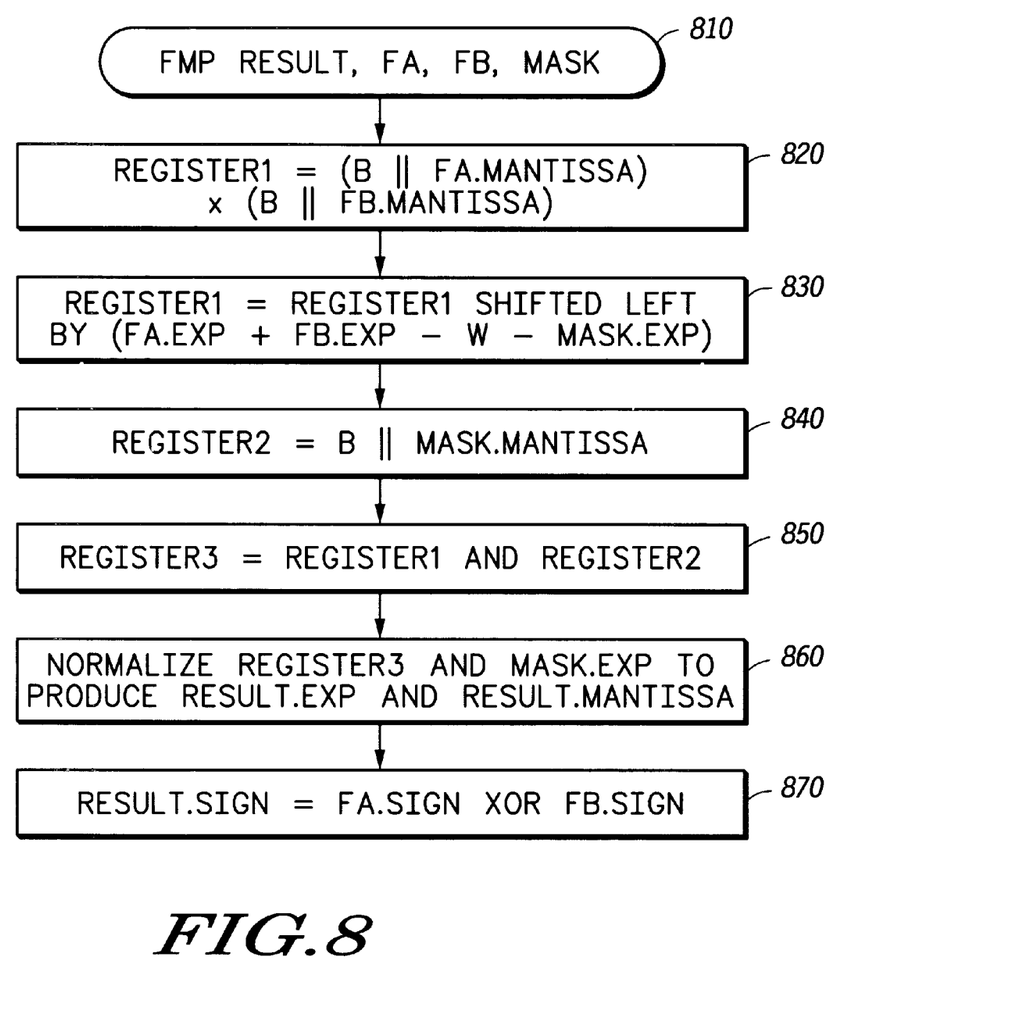
FIG. 8 is a flowchart that illustrates a method for projecting out bits from a product of two numbers according to a mask described by a third number.
Figure 9:
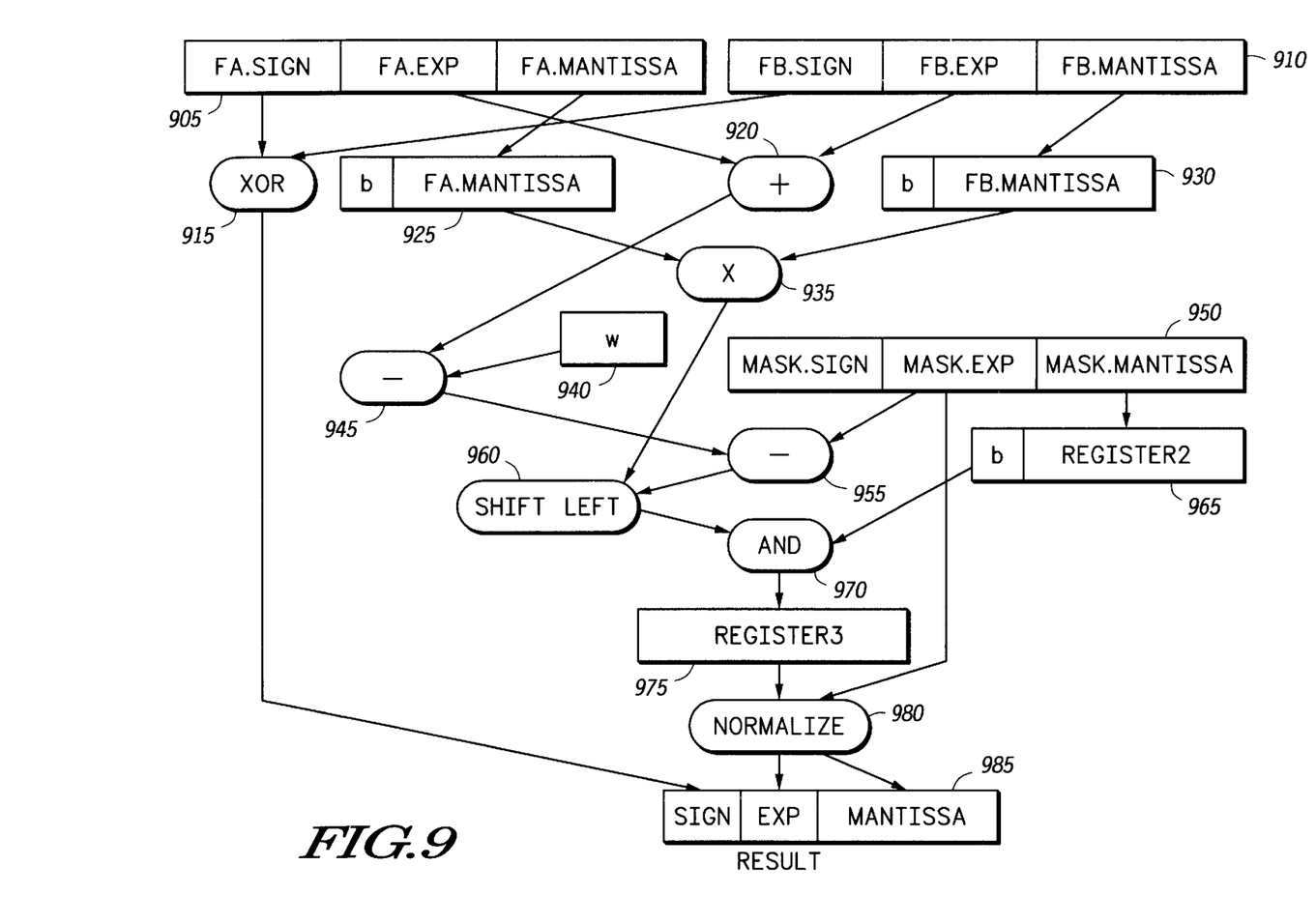
FIG. 9 is a block diagram that illustrates the flow of information in FIG. 8 for projecting out bits from a product of two numbers according to a mask described by a third number.

FIGS. 8 and 9 together illustrate a floating multiply and project (FMP) instruction. FIG. 8 is a flowchart illustrating operation of the FMP instruction. FIG. 9 is a block diagram that illustrates operation of the method in the flowchart in FIG. 8. The floating multiply and project (FMP) instruction has three input operand registers: a first input operand (FA) 905, a second input operand (FB) 910, and a mask 950, and a result output operand register 985, typically all residing in floating point registers, step 810. The FA 905 mantissa is extracted 925 and concatenated with the implied high order bit ("b") 925. The FB 910 mantissa is likewise extracted and concatenated with the implied high order bit ("b") 930. These high order bits ("b") are equivalent to those shown in FIGS. 6 and 7. The extracted FA mantissa 925 and the extracted FB mantissa 930 are multiplied together 935, step 820. The FA 905 exponent is added 920 to the FB exponent 910 and from this sum 920 is subtracted 945 a width constant ("w") 940. The width constant ("w") 940 is used to characterize the difference in widths of a single floating-point number and a product of two floating-point numbers. For IEEE 754-1984 normalized numbers in which the fractional part has a form 1.n (meaning 1 bit before the binary point and n bits after the binary point), a product before normalization will have a form 2.2n (2 bits before the binary point and 2n bits after it). A mask will also have a form 1.n. In order for a product of the form 2.2n to line up with a mask of the form 1.n, the product would have to be shifted right by w=n bits so the binary point and bits of the (2n+2) bit product register would line up with the corresponding binary point and bits of the (n+1) bit mask. Since this alignment is fixed, it can also be achieved by direct wiring. From this difference 945 is subtracted 955 the mask 950 exponent resulting in a shift count. The product 935 is left shifted 960 by the shift count 955, step 830. If the shift count 955 is negative, the shift is a right shift by the magnitude of the shift count. The mask 950 mantissa is extracted and concatenated with the implied high order bit ("b") 965, step 840. The left shifted product 960 is logically ANDed 970 with the extracted mask mantissa 965 and registered in an intermediate register 975, step 850. The contents of the intermediate register 975 and the mask 950 exponent are normalized 980 to generate the result 985 exponent and mantissa, step 860. The sign of the result 985 is generated by XORing 915 the FA 905 sign bit with the FB 910 sign bit, step 870. This is equivalent to projecting the product of the FA 905 and FB 910 registers, such that the projection operation and normalization of the projected result are done before the intermediate product is rounded. No rounding is needed after the projection. Note that with this instruction, a bit sequence of arbitrary length up to the number of significant bits in a floating-point fraction and with arbitrary alignment can be extracted from the exact product of two floating-point numbers. With reference to FIG. 1, if the numbers "a" and "e" are represented by 50-bit sequences, the high order and low order 50 bits of the product are readily obtained with just the two instructions:

fmp high_50, a, e, mask_high
fmp low_50, a, e, mask_low

Neither of these instructions depends on the result of the other instruction, so that they may be issued independently of each other. Note also that the selection of 50-bit sequences is determined entirely by the mask, which is controllable by the programmer. If in another context 47 bits were needed, the programmer could simply select another mask and achieve 47-bit projections with equal efficiency. This has at least three advantages over the use of fused multiply-add instructions (fmadd) instructions available in the prior art. First, the two results are obtained independently. This has significant performance advantages in pipelined FPUs. Second, the two results may have arbitrary bit lengths. Third, the alignments of the two results are under control of the programmer and are not dependent on the particular values of "a" and "e".

In computations like Newton-Raphson iterations for reciprocals, the high-order bits after some stage of iteration may be known (for example, to be .11111 . . . 1), and so the low bits can be used without needing to compute the high bits at all.

Figure 10:
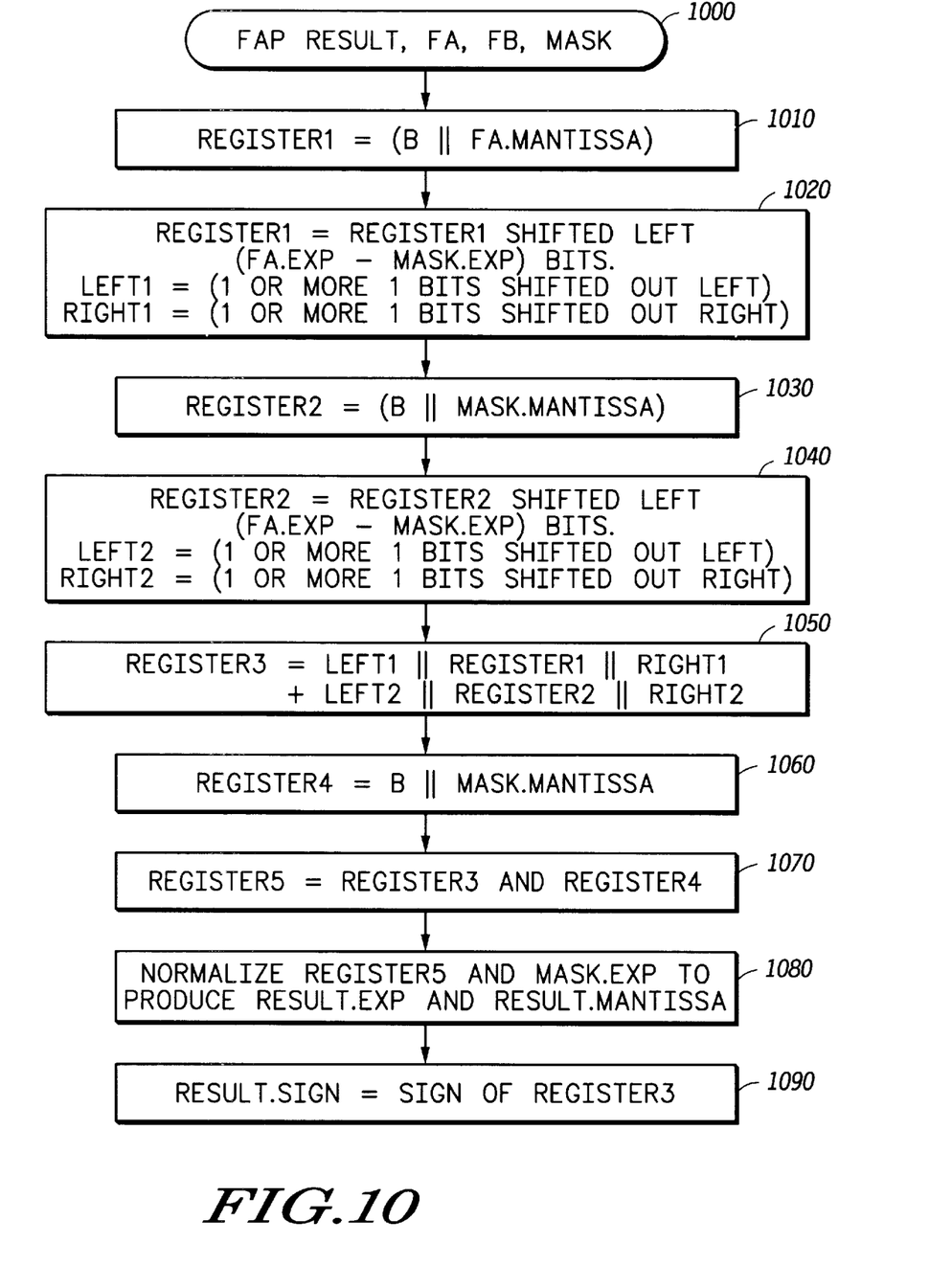
FIG. 10 is a flowchart that illustrates a method for projecting out bits from a sum or difference of two numbers according to a mask described by a third number.
Figure 11:
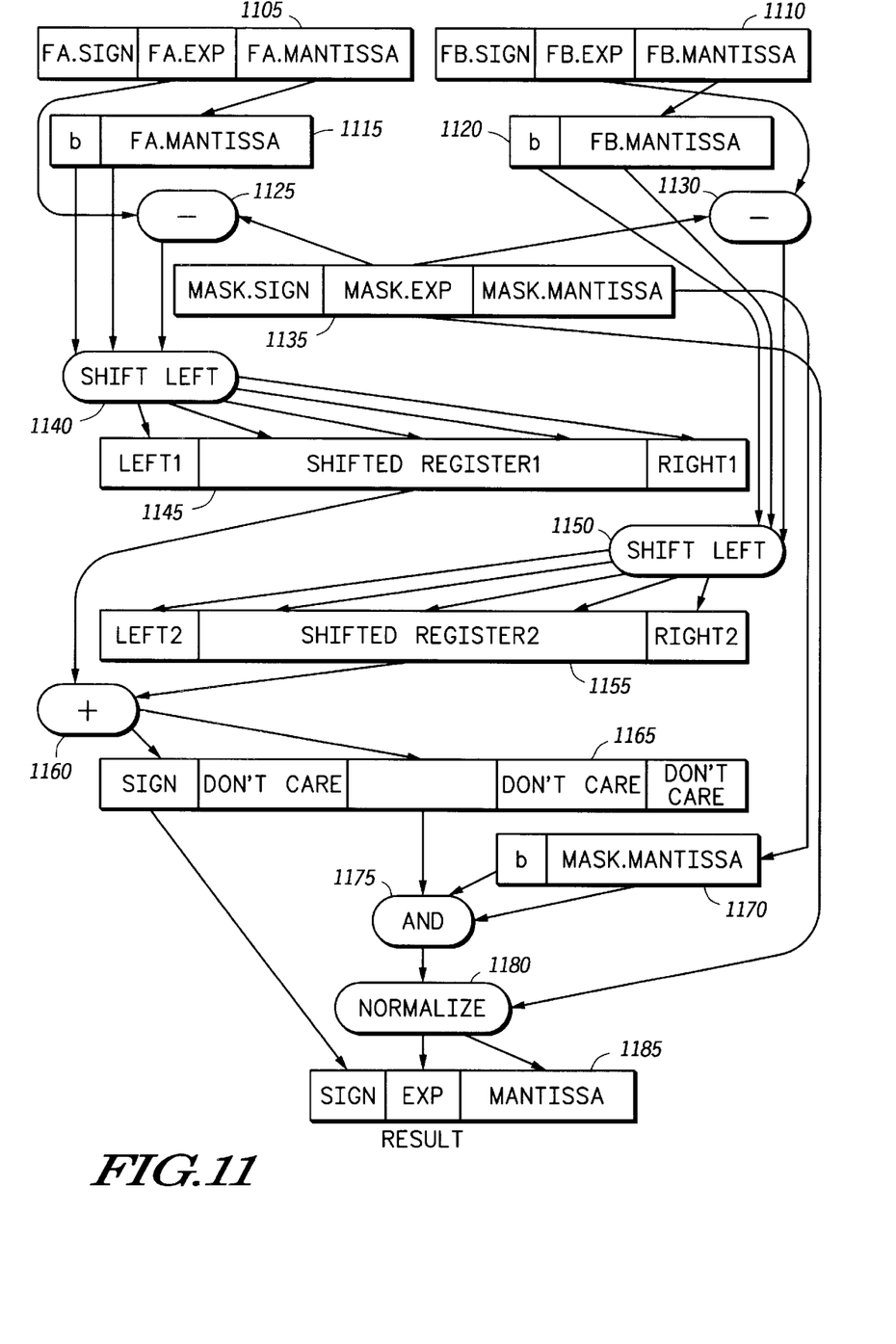
FIG. 11 is a block diagram that illustrates the flow of information in FIG. 10 for projecting out bits from a sum or difference of two numbers according to a mask described by a third number.

FIGS. 10 and 11 together illustrate operation of a floating add and project (FAP) instruction. The add operation is intended to include both the cases of addition and subtraction, and FAP should be considered to also include the case of FSP (floating subtract and project). Typically, subtraction on sign-magnitude representations of floating-point numbers is carried out by changing the sign of the second input argument and adding, so the minor distinctions between addition and subtraction are well known. FIG. 10 is a flowchart illustrating operation of the FAP instruction. FIG. 11 is a block diagram illustrating operation of the flowchart in FIG. 10. The floating add and project instruction (FAP) has three input operand registers: a first operand (FA) 1105, a second operand (FB) 1110, and a mask 1135, and one output result 1185, step 1000, all typically residing in floating point registers. A first intermediate register ("REGISTER1") 1115 is loaded with the FA 1105 mantissa concatenated with an implied high order bit ("b"), step 1010. A first shift count is computed by subtracting the mask 1135 exponent from the FA 1105 exponent. This is used to left shift 1140 the first intermediate register ("REGISTER1") 1115, step 1020. The first and second intermediate registers have width "m", where "m" is the number of significant bits in a floating point number. In this left shift 1140, a first left sticky bit is set if any bits are shifted out to the left of the first intermediate register ("REGISTER1") 1115, and a first right sticky bit is step if any bits are shifted out to the right. This is repeated for the second input operand (FB) 1110. A second intermediate register ("REGISTER2") 1120 is loaded with the FB 1110 mantissa concatenated with the implied high order bit ("b"), step 1030. A second shift count is computed by subtracting the mask 1135 exponent from the FB 1110 exponent. This second shift count is used to left shift 1150 the second intermediate register ("REGISTER2") 1120, step 1040. A second left sticky bit and a second right sticky bit are set accordingly if bits are shifted out of the left or right of the second intermediate register ("REGISTER2") 1120. A first shifted intermediate register 1145 has the first left sticky bit concatenated with the shifted first intermediate register concatenated with the first right hand sticky bit. The first and second shifted intermediate registers have width 3m+2 bits, with the middle m bits representing the position where the first or second intermediate register would be moved if the shift count were zero. The second shifted intermediate register 1155 has the second left sticky bit concatenated to the second shifted second intermediate register concatenated to the second right sticky bit. The first shifted intermediate register 1145 is added 1160 to the second shifted intermediate register 1155 and registered in a third intermediate register ("REGISTER3") 1165, step 1050. The addition may represent signed addition or addition or subtraction. The purpose of the left sticky bits is to capture the correct sign of the result if one of the input operands has been shifted far enough to the left that it has no 1 bits remaining which can overlap the mask. If exactly one operand has been shifted left this much, then this sticky bit will cause the correct sign to be generated. If both operands have been shifted left this much, then the exact result will have no bits which overlap the mask and the result will be zero and the sign is immaterial, since +0 and −0 both represent the single number 0. In an implementation in which the sign of 0 is significant, and in which both operands had been shifted left to create a sticky bit, a straightforward alternative is to simply compute the sum and return a zero with the sign of the sum. The purpose of the right sticky bits is to create intermediate 1 bits if the addition is of numbers of unlike sign and one number has been shifted so far to the right that it can have no bits which overlap the mask bits. Again, if both numbers have been shifted that far, the result will be zero and the sign is immaterial as before (and again, an implementation in which the sign of 0 is significant could compute the sum and return a zero with the sign of the sum). A fourth intermediate register ("REGISTER4") 1170 is loaded with the mask 1135 mantissa concatenated to the implied high order bit ("b"), step 1060. The central m bits of the third intermediate register ("REGISTER3") 1165 and the fourth intermediate register ("REGISTER4") 1170 are ANDed 1175, step 1070, and normalized 1180 using the mask 1135 exponent to generate the result 1185 exponent and mantissa, step 1080. The result 1185 sign bit is set to the sign bit in the third intermediate register ("REGISTER3") 1165, step 1090. A floating add and project (FAP) instruction was illustrated in FIGS. 10 and 11. A floating subtract and project (FSP) instruction is implemented in a similar manner. As with the floating multiply and project (FMP), the FAP and FSP instructions project the sum or difference before normalization and rounding, and rounding is not necessary after projection.

For the multiprecision computation illustrated in FIG. 1, the computation of the high and low parts of the sums of high(af), high(be), low(ae), high(cd), low(bd) may be achieved by:

fadd temp1, high(af), high(be)

fadd temp2, low(ae), high(cd)

fadd temp3, temp1, low(bd)

fap high_sum, temp2, temp3, high_mask fap low_sum, temp2, temp3, low_mask

Note that the first three adds can be done with simple add instructions. The width of 50 bits was chosen to enable this operation. Further note that neither fap instruction depends the other, so that they may be easily and efficiently scheduled either by a compiler or by a CPU dispatch unit.

Figure 12:
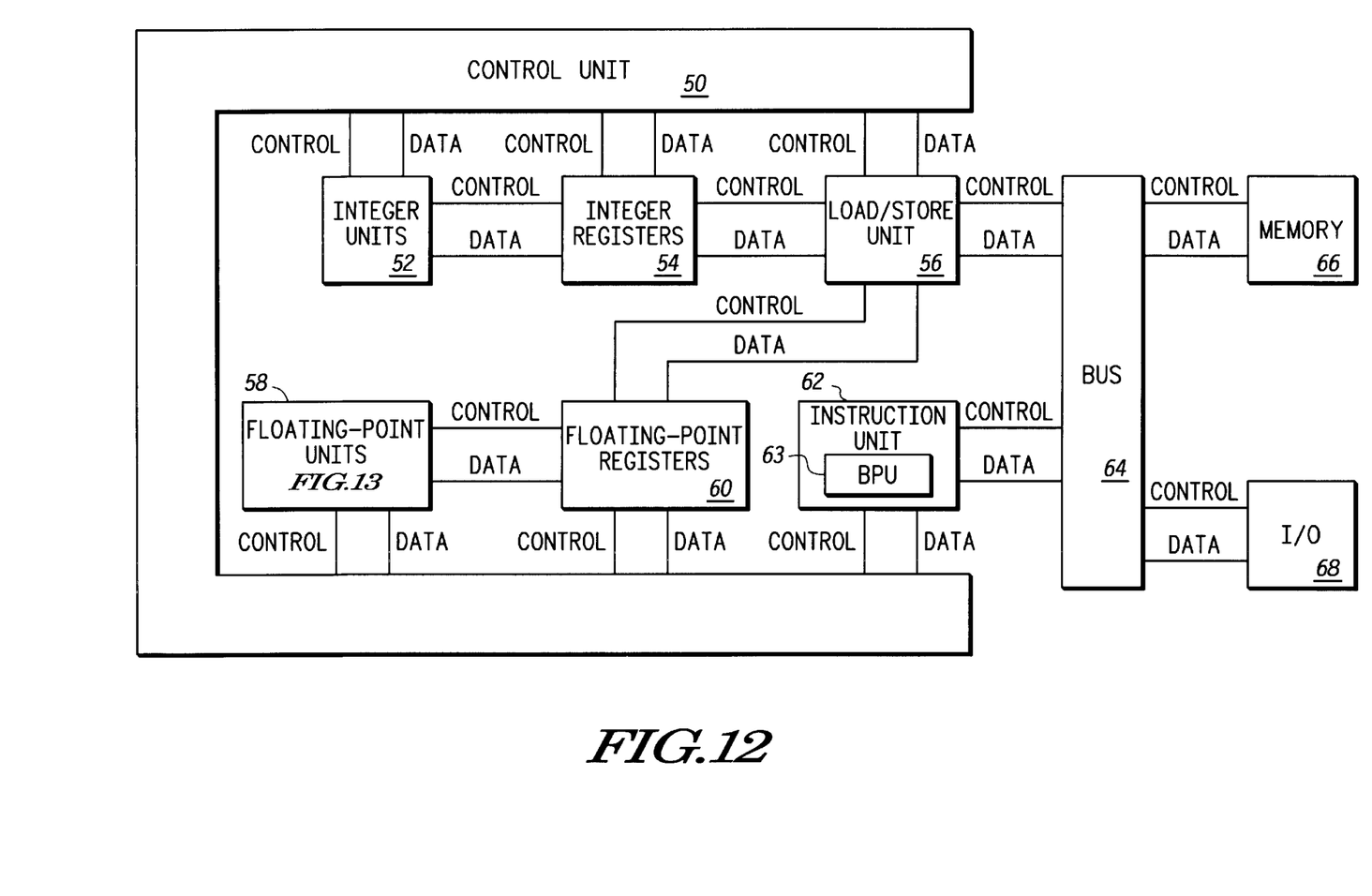
FIG. 12 is a block diagram that illustrates a processor containing a plurality of floating-point units which implement one or more of the instructions included in the present invention.

FIG. 12 is a block diagram showing high level components of a Data Processor, in accordance with the current invention. A Control Unit 50 is coupled to one or more Integer arithmetic Units 52 which carry out arithmetic and logical operations on values stored in a set of Integer Registers 54, one or more Floating Point arithmetic Units (FPUs) 58 which carry out operations on values stored in Floating Point Registers 60, one or more Load/Store Units 56 which connect the Integer Registers 54 and Floating Point Registers 60 to external Memory 66 and input/output units 68 through a Bus interface 64, and an Instruction Unit 62 and Branch Processing Unit 63 which control the fetching, dispatching and completion of instructions. In some processors, some of these units may be combined or the functionality otherwise partitioned in some similar fashion.

The Floating Point Unit (FPU) 58 is assumed to comply with IEEE754 standards for 32 and 64 bit floating point arithmetic. In particular, the IEEE-754 64-bit execution model implements binary floating point numbers with a one bit sign ("G"), an 11 bit exponent ("E"), and a 52 bit fraction ("F") part. The 11 bit exponent (E) is unsigned and biased by 1023, resulting in a range of $2^{-1022}$ to $2^{+1023}$. This invention can be utilized with other floating point representations, making the appropriate changes.

Figure 13:
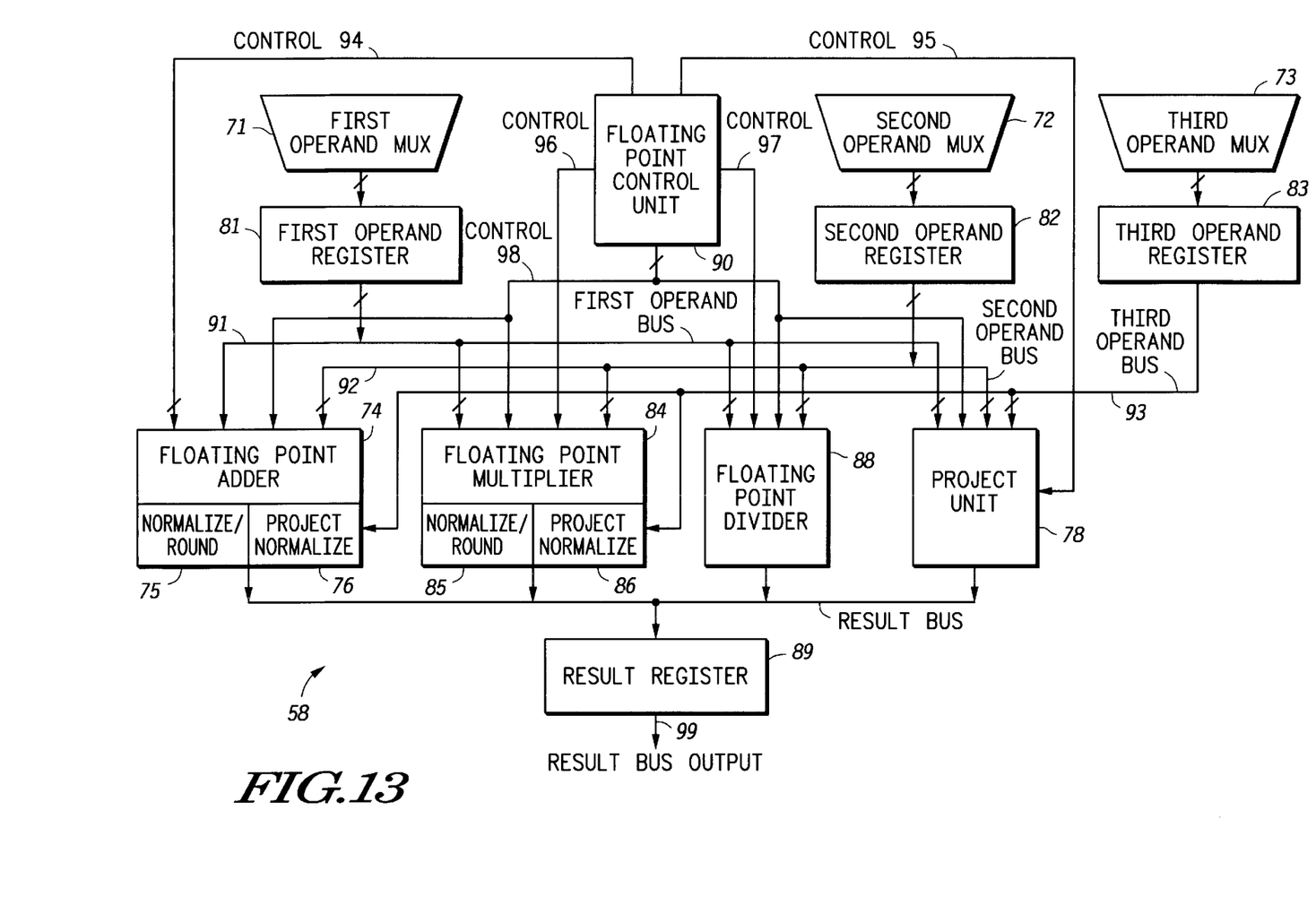
FIG. 13 is a block diagram that illustrates a floating-point unit which implement one or more of the instructions included in the present invention.

FIG. 13 is a block diagram that illustrates a portion of a floating point unit (FPU) 58 in the data processing system shown in FIG. 12 that implements floating point projection instructions, in accordance with the present invention.

A first operand multiplexer (MUX) 71 and a first operand register 81 are used to provide a floating point operand to a first operand bus 91. The source of operands provided to the first operand multiplexer (MUX) 71 could be from a floating point register file, a memory subsystem, or a previous result from this portion of the data processing system. A second operand multiplexer (MUX) 72 and a second operand register 82 are used to provide a floating point operand to a second operand bus 92. A third operand multiplexer (MUX) 73 and a third operand register 83 are used to provide a floating point operand to a third operand bus 93. In the floating point projection instructions illustrated in FIGS. 8–11, the third operand is the projection mask 950, 1135.

The first operand bus 91, the second operand bus 92, and the third operand bus 93 provide data in a parallel fashion to a floating point adder 74, a floating point multiplier 84, a floating point divider 88, and a floating point projection unit 78.

A floating point control unit 90 sends general control information to the floating point adder 74, the floating point multiplier 84, the floating point divider 88, and the floating point projection unit 78 over control lines 94–97. Mathematical unit specific control information is sent by the floating point control unit 90 to the floating point adder 74 over a set of second control lines 94, to the floating point multiplier 84 over a second set of control lines 96, to the floating point divider 88 over a third set of control lines 97, and to the floating point projection unit 78 over a fourth set of control lines 95. Common control lines 98 provide common control functions to all four functional units: the floating point adder 74, the floating point multiplier 84, the floating point divider 88, and the floating point projection unit 78.

The floating point adder 74, floating point multiplier 84, floating point divider 88, and floating point projection unit 78 use the information provided on the first operand bus 91, second operand bus 92, third operand bus 93, and control lines 94–98 to generate a result after a fixed or variable number of clock cycles. The floating point control unit 90 determines which result is placed on the result bus (or output bus) 99.

The floating point adder 74 provides results for floating point addition, subtraction, and integer conversion. The floating point multiplier 84 provides results for floating point multiply. The floating point divider 88 provides results for floating point division, move in, move out, and square root. The floating point projection unit 78 provides the result for the FRANGE and FPROJECT floating point instructions. A result register 89 reads the result bus to register the floating point result for the current floating point operation. The result register 89 provides a value to the result bus output 99. The result register 89 has an input which is multiplexed or selectively coupled to only one output of the circuits 74, 84, 88, and 89 via tri-state buffers or the like. Result register 89 itself may receive all signals (four sets of results in FIG. 13) and multiplex the correct output from control signal(s) (not illustrated as being coupled to result register 89).

The floating point adder 74 contains both a normalize/round circuit 75 and a project/normalize circuit 76. In the case of normal, non-projection, operation, a sum or difference residing in an internal accumulator with additional bits of precision is normalized and rounded by the normalize/round circuit 75. In the case of projection operation, as shown in FIGS. 10–11, the project/normalize circuit 76 is used to project and normalize the sum or difference residing in the internal accumulator. For output for registration in the result register 89, the output from the normalize/round circuit 75 or the project/normalize circuit 76 can be selected using a 2×1 MUX (not shown) controlled by control lines 94, 98.

The floating point multiplier 84 contains both a normalize/round circuit 85 and a project/normalize circuit 86. In the case of normal, non-projection, operation, a product residing in an internal accumulator with additional bits of precision is normalized and rounded by the normalize/round circuit 85. In the case of projection operation, as shown in FIGS. 8–10, the project/normalize circuit 86 is used to project and normalize the product residing in the internal accumulator. For output for registration in the result register 89, the output from the normalize/round circuit 85 or the project/normalize circuit 86 can be selected using a 2×1 MUX (not shown) controlled by control lines 96, 98.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. In a data processor, a method for executing a floating point instruction comprising the steps of:

receiving a floating point range instruction, the floating point range instruction specifying a first floating point operand and a floating point result each having a sign bit field, an exponent field, and a mantissa field;

copying the sign bit field of the first floating point operand into the sign bit field of the floating point result;

copying the exponent field of the first floating point operand into the exponent field of the floating point result; and copying a predetermined value into the mantissa field of the floating point result.

2. The method of claim 1 wherein the step of receiving the floating point range instruction comprises the step of:

storing the first floating point operand in a first floating point register.

3. The method of claim 2 wherein the step of copying the sign bit field of the first floating point operand into the sign bit field of the floating point result comprises the step of:

coupling a sign bit field of the first floating point register to a sign bit field of a second floating point register that will contain the floating point result.

4. The method of claim 2 wherein the step of copying the exponent field of the first floating point operand into the exponent field of the floating point result comprises the step of:

coupling an exponent field of the first floating point register to an exponent field of a second floating point register that will contain the floating point result.

5. The method of claim 1 wherein the step of copying the predetermined value into the mantissa field of the floating point result comprises the step of:

copying a value of zero into each bit position of the mantissa field of the floating point result.

6. The method of claim 1 wherein:

in the step of receiving the floating point range instruction, the floating point range instruction further specifies a second floating point operand having a mantissa field; and the step of copying the predetermined value into the mantissa field of the floating point result further comprises the step of:

copying the mantissa field of the second floating point operand into the mantissa field of the floating point result.

7. In a data processor, a method for executing a floating point instruction, said method comprising the steps of:

A) receiving a floating point project instruction, the floating point project instruction specifying a first floating point operand, a second floating point operand, and a floating point result, each having a sign bit field, an exponent field, and a mantissa field;

B) aligning the mantissa field of the first floating point operand with the mantissa field of the second floating point operand to produce an aligned mantissa result;

C) logically ANDing a mantissa field of the aligned mantissa result with the mantissa field of the second floating point operand to provide a mantissa field for a third floating point operand;

D) loading a value equivalent to the exponent field of the second floating point operand into an exponent field for the third floating point operand;

E) normalizing the third floating point operand to provide a normalized third floating point operand having an exponent field, and a mantissa field;

F) copying the exponent field of the normalized third floating point operand into the exponent field of the floating point result;

G) copying the mantissa field of the normalized third floating point operand into the mantissa field of the floating point result; and H) copying the sign bit field of the first floating point operand into the sign bit field of the floating point result.

8. The method of claim 7 further comprising the steps of:

receiving the first floating point operand and the second floating point operand in a format defined by IEEE standard 754-1984; and converting the first floating point operand and the second floating point operand to have an explicit 1 in a most significant bit position of the mantissa field thereof and subsequently performing steps (B), (C), (D), (E), (F), (G), and (H).

9. The method of claim 7 further comprising the step of:

checking the first floating point operand for a special format prior to the step of aligning, and if the first floating point operand is in the special format, performing the steps of:

optionally providing a default value as the floating point result; and optionally signalling an exception and terminating an execution of the floating point project instruction.

10. The method of claim 9 wherein the step of checking further comprises the step of:

checking the first floating point operand and the second floating point operand for a not-a-number (NaN) format.

11. In a data processor, a method for executing a floating point instruction that generates a final floating point result having a sign bit field, an exponent field, and a mantissa field, said method comprising the steps of:

A) receiving a floating point operation project instruction, the floating point operation project instruction specifying a first floating point operand, a second floating point operand, and a third floating point operand;

B) performing a predetermined arithmetic operation between the first floating point operand and the second floating point operand to provide a first intermediate result having exact bits in a range specified by the third floating point operand and a sign bit resulting from the predetermined arithmetic operation;

C) aligning a mantissa field of the first intermediate result with the mantissa field of the third floating point operand to produce an aligned mantissa result;

D) logically ANDing a mantissa field of the aligned mantissa result with the mantissa field of the third floating point operand to provide a mantissa field of a second intermediate result;

E) loading a value equivalent to the exponent field of the third floating point operand into an exponent field for the second intermediate result;

F) normalizing the second intermediate result to provide a normalized second intermediate result having an exponent field and a mantissa field;

G) copying the exponent field of the normalized second intermediate result into the exponent field of a final floating point result;

H) copying the mantissa field of the normalized second intermediate result into the mantissa field of the final floating point result; and I) copying the sign bit field of the first intermediate result into the sign bit field of the final floating point result.

12. The method of claim 11 wherein the step of performing a predetermined arithmetic operation comprises a step of:

performing a multiplication between the first floating point operand and the second floating point operand.

13. The method of claim 11 wherein the step of performing a predetermined arithmetic operation comprises a step of:

calculating an arithmetic sum between the first floating point operand and the second floating point operand.

14. The method of claim 11 wherein the step of performing a predetermined arithmetic operation comprises a step of:

calculating an arithmetic difference between the first floating point operand and the second floating point operand.

15. The method of claim 11 further comprising the steps of:

receiving the first floating point operand and the second floating point operand in a format defined by IEEE standard 754-1984; and converting the first floating point operand and the second floating point operand to have an explicit I in a most significant bit position of a mantissa field thereof and subsequently performing steps (B), (C), (D), (E), (F), (G), (H), and (I).

16. The method of claim 11 further comprising the step of:

checking the first floating point operand and the second floating point operand for a special format prior to the step of aligning, and if at least one of the first floating point operand and the second floating point operand is in the special format, performing the steps of:

optionally providing a default value as the final floating point result; and optionally signalling an exception and terminating an execution of the floating point instruction.

17. The method of claim 16 wherein the step of checking further comprises the step of:

checking the first floating point operand and the second floating point operand for a not-a-number (NaN) format.

18. The method of claim 16 wherein the step of checking further comprises the step of:

checking the first floating point operand and the second floating point operand for an infinity format.

19. A data processor comprising:

a plurality of floating point registers comprising a floating point operand register and a floating point result register each capable of representing floating point numbers having a sign bit field, an exponent field, and a mantissa field;

an execution unit capable of executing a floating point range instruction, the floating point range instruction specifying the floating point operand register and the floating point result register; and a floating point unit comprising:

a circuit for copying the sign bit field of the floating point operand register into the sign bit field of the floating point result register, a circuit for copying the exponent field of the floating point operand register into the exponent field of the floating point result register, and a circuit for copying a predetermined value into the mantissa field of the floating point result register.

20. A data processor comprising:

a plurality of floating point registers comprising a first floating point operand register, a second floating point operand register, and a floating point result register each capable of representing floating point numbers having a sign bit field, an exponent field, and a mantissa field;

an execution unit capable of executing a floating point project instruction, the floating point project instruction specifying the first floating point operand register and the floating point result register; and a floating point unit comprising:

a circuit for aligning the mantissa field of the first floating point operand register with the mantissa field of the second floating point operand register to produce an aligned mantissa result, a circuit for logically ANDing a mantissa field of the aligned mantissa result with the mantissa field of the second floating point operand register to provide a mantissa field for a third floating point operand, a circuit for loading a value equivalent to the exponent field of the second floating point operand register into an exponent field for the third floating point operand, a circuit for normalizing the third floating point operand to provide a normalized third floating point operand having an exponent field and a mantissa field, a circuit for copying the exponent field of the normalized third floating point operand into the exponent field of the floating point result register, a circuit for copying the mantissa field of the normalized third floating point operand into the mantissa field of the floating point result register, and a circuit for copying the sign bit field of the first floating point operand register into the sign bit field of the floating point result register.

21. A data processor comprising:

a plurality of floating point registers comprising a first floating point operand register, a second floating point operand register, a third floating point operand register, and a floating point result register each capable of representing floating point numbers having a sign bit field, an exponent field, and a mantissa field;

an execution unit capable of executing a floating point operation project instruction, the floating point operation project instruction specifying a first floating point operand register, a second floating point operand register, and a third floating point operand register; and a floating point unit comprising:

a circuit for performing a predetermined arithmetic operation between the first floating point operand register and the second floating point operand register to provide a first intermediate result having exact bits in a range specified by the third floating point operand register and a sign bit resulting from the predetermined arithmetic operation, a circuit for aligning a mantissa field of the first intermediate result with the mantissa field of the third floating point operand register to produce an aligned mantissa result, a circuit for logically ANDing a mantissa field of the aligned mantissa result with the mantissa field of the third floating point operand register to provide a mantissa field of a second intermediate result, a circuit for loading a value equivalent to the exponent field of the third floating point operand register into an exponent field for the second intermediate result, a circuit for normalizing the second intermediate result operand to provide a normalized second intermediate result having an exponent field and a mantissa field, a circuit for copying the exponent field of the normalized second intermediate result into the exponent field of the floating point result register, a circuit for copying the mantissa field of the normalized second intermediate result into the mantissa field of the floating point result register, and a circuit for copying the sign bit field of the first intermediate result into the sign bit field of the floating point result register.

\* \* \* \* \*